Patented Apr. 7, 1953

2,634,298

UNITED STATES PATENT OFFICE 2,634,298

SEPARATION OF ISOMERIC ERYTHRITOLS BY FRACTIONAL CRYSTALLIZATION

Chester M. Himel and Lee O. Edmonds, Bartlesville, Okla., assignors to Phillips Petroleum Company, a corporation of Delaware No Drawing. Application December 31, 1948, Serial No. 68,738

8 Claims. (Cl. 260—637)

This invention relates to a method for separating mixtures of isomeric erythritols into their component isomers. In one of its aspects, the invention relates to selective crystallization of meso-erythritol and dl-erythritol from solutions of the same.

In the prior art, the synthesis of erythritol from various raw materials is well known. For example, butadiene can be hydroxylated by hydrogen peroxide in the presence of formic acid to yield erythritol. The erythritol or butantetrol-1,2,3,4 product of these processes is a white crystalline solid. It exists in the form of two principal isomers, the internally compensated meso-erythritol and the racemic mixture of optically active sub-isomers, d- and l-erythritol, which mixture is commonly denominated dl-erythritol. Meso- and dl-erythritol have, respectively, the formulae:

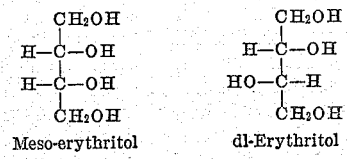

The products have been suggested as intermediates in the preparation of pure dl and pure meso 3,4-dihydroxytetrahydrofuran. The latter of these can form a monomeric cyclic acetal, while the former is limited to polymeric acetals. However, for such purposes, the separation of mixtures of these two isomers is essential because each of the isomers has its own characteristic properties affecting these reactions and uses. Hence, mixtures thereof cannot be used because of the variability of these properties. In addition, meso-erythritol is particularly useful in its pure form as mono-esters with long chain fatty acids.

In the prior art, separation of substantially pure meso-erythritol and substantially pure dl-erythritol from mixtures of the same has been accomplished through extremely difficult and laborious procedures which result in low yields of impure products. One of these prior art procedures involves transforming chemically each of the isomers of erythritol to suitable derivatives so as to obtain a separation of the isomeric derivatives based on a difference in their properties. After the isomeric derivatives have been separated from each other, the derivatives are reconverted to the original erythritols. Such a procedure obviously involves considerable difficulty in obtaining efficient conversion of the meso- and dl-isomers of the erythritol to suitable derivatives and in obtaining the reconversion to erythritols after the separation step. In addition, the failure to discover suitable derivatives of the isomers which possess properties sufficiently different to ensure a ready and cheap separation thereof has prevented the adoption of this separation process to commercial usage. Other known processes for separation of erythritol isomers have similar disadvantages and, as a result, a sufficiently simple and efficient process capable of being adapted to commercial employment is not known today.

According to this invention, it has been found that isomeric meso-erythritol and dl-erythritol can be individually and substantially quantitatively separated from mixtures containing the same by selective crystallization conducted under conditions and in a manner set forth below. Still according to this invention, it has been found that meso-erythritol can be crystallized in a substantially pure form from supersaturated alcoholic solutions of both meso-erythritol and dl-erythritol without concomitantly crystallizing the said dl-erythritol from the said solution. Still further according to this invention, it has been found that meso-erythritol and dl-erythritol can each be separated in a substantially pure form from an alcoholic solution of the same by a simple, two-stage fractional crystallization process involving selectively crystallizing meso-erythritol from a supersaturated solution of the two isomers and then crystallizing the said dl-erythritol from the said solution by seeding it with crystals of dl-erythritol.

It has been found that a highly advantageous feature of the process of this invention not possessed by the prior art processes resides in its selectivity and yield obtainable therewith. That is, if a supersaturated alcoholic solution of a mixture of meso- and dl-erythritols is formed, the meso-erythritol will crystallize first therefrom in a substantially pure form. After crystallization of the meso-erythritol has been completed and after the meso-crystals have been removed from the remaining solution of dl-erythritol, the dl-erythritol can be crystallized from the alcoholic solution by seeding the said solution with a crystal of dl-erythritol. It is of the essence of this invention that a certain order for the crystallization of the two isomers of erythritol be observed. That is, the order in which the crystallization of the two isomers is to be accomplished must be first to crystallize the meso-erythritol and then to crystallize the dl-erythritol. Thus it has been found that if an attempt is made to crystallize the dl-erythritol before completely crystallizing the meso-erythritol, then both meso- and dl-erythritol will simultaneously crystallize and separation thereof will be defeated. Therefore, it is noted that the order of crystallization is critical. Accordingly, the meso-erythritol isomer is crystallized first from the supersaturated solution of meso- and dl-isomers and then dl-erythritol is crystallized. Thus it has been discovered that in a solution supersaturated with respect to both meso- and dl-erythritols, the dl-erythritol will not crystallize spontaneously within any reasonable interval of time from the solution. Even when the said solution is first seeded with crystals of meso-erythritol, the dl-erythritol will not crystallize. Thus, the crystallization of dl-erythritol, according to this invention, must be initiated by some suitable means such as by seeding with crystals thereof. Hence, it is important to obtain complete dissolution of all crystalline dl-erythritol prior to the crystallization of meso-erythritol from solutions of the two isomers.

In order to more fully describe this invention, one of its specific embodiments is now set forth.

A crude mixture comprising meso- and dl-erythritols is dissolved in an equal weight of ethyl alcohol solvent by boiling the solvent with the erythritols. The boiling should continue slightly longer than is required to provide an homogeneous system in order to ensure complete dissolution of the erythritols. The solution is then cooled to a temperature at which the solution is supersaturated with respect to the erythritols. Usually a temperature in the range of minus 20° to 20° C. or, preferably 5° C., is sufficient to accomplish the requisite supersaturation. After cooling to the aforesaid temperatures, crystallization of meso-erythritol begins and proceeds rapidly. Upon termination of crystallization, substantially all of the meso-erythritol has been crystallized from the alcoholic solution of the mixed isomers leaving the dl-erythritol remaining dissolved in the alcoholic solvent. Initiation of crystallization of the meso-isomer can be hastened by adding seed crystals of meso-erythritol to the supersaturated solution, although such seeding is not usually essential. The crystalline meso-erythritol is then separated from the alcoholic solvent from which it has crystallized by filtering it from the said solvent. The separated meso-crystals can then be washed and dried.

The liquid filtrate remaining after crystallization of the meso-erythritol isomer therefrom is composed of dl-erythritol and alcohol. It is now concentrated by boiling off excess alcohol to reduce its original volume by about one-half. The concentrated alcoholic solution of dl-erythritol is then cooled to a temperature between minus 20° and 20° C., preferably 5° C. At this temperature, the alcoholic solvent will be supersaturated with the dl-erythritol isomer which can then be crystallized by seeding the supersaturated solution with a seed crystal of dl-erythritol. The crystallization of the latter isomer continues until substantially all of it has been removed from solution. As stated, seeding with crystals of dl-erythritol is necessary to initiate crystallization of this isomer. The resulting crystalline dl-erythritol is then filtered from the alcoholic solvent and washed and dried. The crystallization of both meso- and dl-erythritol is substantially quantitative since neither compound is appreciably soluble in the alcoholic solvent under the conditions of operation of this invention.

While ethyl alcohol is preferably employed as a solvent for the isomeric erythritols of this invention, other alcohols, such as methyl, propyl, butyl, are also applicable. Mixtures of two or more of these alcohols can also be employed. The amount of solvent employed should be sufficient to dissolve the crude isomeric erythritol mixture. Generally, the amount by weight of the alcoholic solvent employed can range from one-half to twice the weight of the crude isomeric erythritol mixture, but preferably, a weight of alcoholic solvent equal to that of the isomeric erythritol mixture is used. Larger amounts can be used but, obviously, these larger amounts will reduce the completeness of the crystallization of either or both of the erythritol isomers from their solution. As stated, substantially quantitative separation of the isomers from the alcoholic solvent is an advantage of this invention and hence the amount of said solvent used must be limited to obtain this advantage. As further stated, adequate refluxing or boiling of the solvent during dissolution of the erythritols completely dissolves any crystalline dl-erythritol or other materials which can cause adventitious seeding of the dl-erythritol. This is an important feature of this invention since it is imperative to completely dissolve the dl-erythritol in the alcohol to prevent adventitious seeding thereof during the crystallization of the meso-isomer. It is a peculiar and important property of dl-erythritol that adventitious seeding thereof can be prevented by the above described procedure of this invention. It is thus apparent that in order to successfully separate these two isomers by crystallization, it is necessary that meso-isomer be completely crystallized and removed from the alcoholic solvent before any substantial crystallization of the dl-isomer occurs. It is also important to take any other precautions necessary to prevent this adventitious seeding. For example, it is essential to prevent contact of the solution with an atmosphere contaminated with materials which will initiate crystallization of the dl-erythritol. In the practice of our invention we have preferred to carry out the crystallization either in a closed system, in the same vessel used for forming the solution of the erythritol isomers or in a closed crystallizer connected with the latter vessel by a tube or pipe.

As stated, the meso-erythritol crystals can be removed from the remaining alcoholic solution which still contains the dl-erythritol in dissolved form. This embodiment is preferred. However, it is noted that the presence of meso-erythritol crystals will not interfere with the subsequent crystallization of the dl-erythritol.

The following example will serve to further explain the process of this invention.

Example

A mixture comprising meso- and dl-erythritols is prepared by hydroxylating 1,3-butadiene with hydrogen peroxide in the presence of a formic acid catalyst. Catalyst and water are removed by distillation in vacuo. Final traces of formic acid are removed by solution of the product in methanol and distillation of the solvent, whereby the formic acid is discharged overhead as methyl formate.

The crude mixture thus produced is then dissolved in an equal weight of ethyl alcohol by refluxing therewith. When homogeneous, the solution is refluxed for an additional five minutes after which it is cooled to about 5° C. Crystallization of meso-erythritol is induced by adding a crystal of this isomer, upon which precipitation is initiated immediately, reaching completion in about six hours. This product is removed on a filter, washed with cold ethanol and dried.

The filtrate resulting from the above crystallization step is then reduced to half its volume and again cooled to 5° C. A seed crystal of dl-erythritol is added to initiate crystallization of this isomer. The crystallization proceeds to completion in about six days. The product is removed, washed with cold ethanol, and dried.

The meso-erythritol obtained is a white crystalline solid melting at 121–122° C. and having a boiling point of about 200° C. at 1 mm. pressure. This product is remarkably heat stable and withstands refluxing at 215° C. for 30 minutes without apparent decomposition. The dl-erythritol obtained is a white crystalline solid melting at 69–70° C.

Variation and modification are possible within the scope of the appended claims to the invention, the essence of which is that mixtures of meso- and dl-erythritols can be separated substantially quantitatively by a simple, orderly, two-stage fractional crystallization process.

We claim:

1. A fractional crystallization process for separating meso-erythritol from dl-erythritol comprising dissolving a mixture of said meso- and dl-erythritols in an alcoholic solvent, cooling the resulting solution to a temperature at which the said solution is supersaturated with respect to the said erythritols, crystallizing and then removing said meso-erythritol from said solution while retaining all said dl-erythritol in said solution, concentrating the remaining solution of dl-erythritol, cooling the resultant concentrated solution to a temperature at which the solution is supersaturated with said dl-erythritol and crystallizing said dl-erythritol therefrom by seeding with crystals of dl-erythritol.

2. A process for separating meso-erythritol and dl-erythritol from mixtures thereof comprising dissolving said mixture in a quantity of an alcoholic solvent between one-half to twice the weight of the said mixture by boiling said solvent with said mixture, cooling the resulting solution to a temperature at which the said solution is supersaturated with said meso- and dl-erythritols, crystallizing said meso-erythritol from said supersaturated solution while retaining all said dl-erythritol in solution, removing the remaining solution from said crystals, concentrating said remaining solution to about one-fourth to three-fourths of its original volume, cooling the resultant concentrated alcoholic solution of dl-erythritol to a temperature at which the solution is supersaturated with the said dl-erythritol and then crystallizing said dl-erythritol therefrom by seeding with crystals of dl-erythritol.

3. A process for separating meso-erythritol and dl-erythritol from mixtures thereof comprising dissolving said mixture in an equal quantity by weight of an alcoholic solvent by boiling said solvent with said mixture, cooling the resulting solution to a temperature in the range of minus 20° C. to 20° C., crystallizing said meso-erythritol from said cooled solution, recovering crystals of meso-erythritol thus formed from said solvent, concentrating the resulting alcoholic solution of said dl-erythritol to about one-half its original volume by vaporizing a portion of said solvent therefrom, cooling the concentrated solution to a temperature in the range of minus 20° C. to 20° C., seeding the last said cooled solution with a crystal of dl-erythritol and recovering the dl-erythritol crystals thus formed.

4. The process of claim 3 wherein the alcoholic solvent comprises ethyl alcohol.

5. The process of claim 3 wherein the alcoholic solvent comprises propyl alcohol.

6. The process of claim 3 wherein the alcoholic solvent comprises butyl alcohol.

7. A process for separating meso-erythritol and dl-erythritol from mixtures thereof comprising dissolving said mixture in an equal quantity by weight of an ethyl alcohol solvent by boiling said solvent in presence of said mixture, cooling the resulting solution to a temperature in the range of minus 20° C. to 20° C., seeding the said cooled solution with a crystal of meso-erythritol, recovering the crystals of meso-erythritol thus formed from said solvent, concentrating the resulting ethyl alcohol solution of said dl-erythritol to about one-half its original volume by vaporizing said solvent, cooling the concentrated solution to a temperature in the range of minus 20° C. to 20° C., seeding the last said cooled solution with a crystal of dl-erythritol and recovering the dl-erythritol crystals thus formed.

8. A process for separating meso-erythritol and dl-erythritol from mixtures thereof comprising dissolving said mixture in an equal quantity by weight of an ethyl alcohol solvent by boiling said solvent in presence of said mixture, cooling the resulting solution to about 5° C., seeding the said cooled solution with a crystal of meso-erythritol, removing the crystals of meso-erythritol thus formed, concentrating the resulting ethyl alcohol solution of dl-erythritol to about one-half its original volume by vaporizing said solvent, cooling the concentrated solution to about 5° C., seeding the last said cooled solution with dl-erythritol and removing the dl-erythritol crystals thus formed.

CHESTER M. HIMEL.
LEE O. EDMONDS.

REFERENCES CITED

The following references are of record in the file of this patent:

UNITED STATES PATENTS

| Number | Name | Date |
| --- | --- | --- |
| 2,069,064 | Gore | Jan. 26, 1937 |
| 2,233,606 | Hass | Mar. 4, 1941 |
| 2,270,839 | Wyler | Jan. 20, 1942 |
| 2,325,783 | Lorand | Aug. 3, 1943 |
| 2,382,288 | Braun et al. | Aug. 14, 1945 |
| 2,437,277 | Soday | Mar. 9, 1948 |
| 2,456,752 | Surmatis | Dec. 21, 1948 |

OTHER REFERENCES

Comptes Rendus, vol. 117, p. 555 (Oct. 25, 1893) (Griner).